UNITED STATES PATENT OFFICE.

JOHN TROWBRIDGE, OF CAMBRIDGE, MASSACHUSETTS.

PROCESS OF RENOVATING STORAGE-BATTERIES.

SPECIFICATION forming part of Letters Patent No. 551,565, dated December 17, 1895.

Application filed October 1, 1895. Serial No. 564,319. (No specimens.)

*To all whom it may concern:*

Be it known that I, JOHN TROWBRIDGE, of Cambridge, in the county of Middlesex and State of Massachusetts, have invented a new and Improved Process of Renovating Storage-Batteries, of which the following is a full, clear, and exact description.

It is well known that in the form of storage-battery or accumulator in which an oxide of lead is used to form the active material the battery is subject to deterioration due to a number of causes, among which may be mentioned injurious sulphation. The deterioration of the lead storage-batteries is so great that the period of active service is often limited to a year and rarely exceeds five years. During the comparatively short time they are efficient they have to be treated with great care.

The object of my invention is to provide a process by means of which a battery which has become useless can be completely restored to its normal efficiency.

My improved process consists in removing temporarily the negative elements or plates of the storage-battery after the battery has been charged, and in replacing them by amalgamated zinc plates, then discharging the battery, afterward removing the zinc plates and returning the lead negative element to the battery while the battery is recharged. I then remove the negative elements and again insert the zinc plates, when the battery is again discharged. This process is repeated until the battery has been restored to its normal efficiency. I have found by actual experiment that this process completely restores the battery after injurious sulphation.

I am aware that amalgamated zinc has been used to form an integral part of a complete storage-battery, being always in position as the negative element, being used instead of lead negative plates. Zinc plates used in this manner give rise to grave defects in the practical working of the same. In the process of charging the zinc plate is gradually eaten away and the plates crumble, and while the zinc is used permanently for the negative plates in a storage-battery the corrosion of the connections through the zinc plates proves to be a fatal defect.

In my process of renovation the zinc plates are never used in the charging-cell, the lead negative plates being always used for this purpose, the zinc plates being used instead of the negative lead plates only for the purpose of discharging the cells. Manipulating the battery in the manner described gives a higher electromotive force to the cell during discharge than it has acquired by charging with the negative lead plate.

Having thus described my invention, I claim as new and desire to secure by Letters Patent—

1. The method of renovating lead storage batteries or accumulators, which consists in charging the cell, removing the negative lead elements from the cell, replacing them by an amalgamated zinc element and then discharging the storage battery or accumulator, as specified.

2. The method of renovating lead storage batteries or accumulators, which consists in charging the cell, removing the negative lead elements from the cell, replacing them by an amalgamated zinc element, and then discharging the storage battery or accumulator, then removing the zinc plate, inserting the lead negative plate, again charging the battery, then charging the negative lead plate, again substituting the zinc plate and discharging the battery, and repeating the charging with the lead negative and discharging with the zinc plate until the cell is restored to its normal efficiency, as specified.

JOHN TROWBRIDGE.

Witnesses:
FREDERICK A. OLSSON,
M. M. SAWIN.